US011624337B2

(12) United States Patent
Shirai et al.

(10) Patent No.: US 11,624,337 B2
(45) Date of Patent: Apr. 11, 2023

(54) TWO-CYCLE ENGINE

(71) Applicant: Yamabiko Corporation, Tokyo (JP)

(72) Inventors: Ken Shirai, Tokyo (JP); Shiro Yamaguchi, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 0 days.

(21) Appl. No.: 17/859,151

(22) Filed: Jul. 7, 2022

(65) Prior Publication Data

US 2023/0036494 A1 Feb. 2, 2023

(30) Foreign Application Priority Data

Jul. 29, 2021 (JP) .............................. JP2021-124482

(51) Int. Cl.
*F02F 1/22* (2006.01)
*F02B 25/14* (2006.01)
(Continued)

(52) U.S. Cl.
CPC ................ *F02F 1/22* (2013.01); *F02B 25/14* (2013.01); *F02B 33/04* (2013.01); *F02B 2075/025* (2013.01)

(58) Field of Classification Search
CPC . F02F 1/22; F02F 7/0036; F02B 25/14; F02B 33/04; F02B 2075/025;
(Continued)

(56) References Cited

U.S. PATENT DOCUMENTS 3,797,467 A * 3/1974 Tenney .................. F02B 25/00
123/73 AA
2001/0029912 A1 10/2001 Laimbock
(Continued)

FOREIGN PATENT DOCUMENTS

EP 1048831 A2 11/2000
EP 1726802 A1 * 11/2006 .............. F02B 25/14
(Continued)

OTHER PUBLICATIONS

Extended European Search Report pertaining to corresponding European Patent Application No. 22187623.8, dated Dec. 12, 2022.

*Primary Examiner* — Grant Moubry
(74) *Attorney, Agent, or Firm* — Grumbles Law PLLC; Brittany Nanzig

(57) ABSTRACT

Two-cycle engine includes cylinder block formed with a cylinder and crank chamber. The cylinder block includes: an exhaust passage leading to a combustion chamber in the cylinder through an exhaust port opened to an inner circumferential surface of the cylinder; a scavenging port opened to the inner circumferential surface of the cylinder; a communication passage extending from the scavenging port in a radial direction of the cylinder; and a scavenging passage extending in an axial direction of the cylinder, communicating with the crank chamber, and having an opening portion formed in a bottom surface of the communication passage. A ceiling surface of the communication passage is inclined toward a cylinder head with increasing distance from a scavenging passage side thereof toward the scavenging port. A bottom surface of the communication passage is inclined toward the crank chamber with increasing distance from a scavenging passage side thereof toward the scavenging port.

12 Claims, 5 Drawing Sheets

(51) Int. Cl.
*F02B 33/04* (2006.01)
*F02B 75/02* (2006.01)

(58) Field of Classification Search
CPC .......... F02B 2710/036; F02B 2720/136; F02B 2720/236
See application file for complete search history.

(56) References Cited

U.S. PATENT DOCUMENTS

| | | | |
|---|---|---|---|
| 2002/0134326 A1* | 9/2002 | Araki | F02B 63/02 123/73 A |
| 2003/0079344 A1* | 5/2003 | Matuura | F02F 1/00 29/888.06 |
| 2012/0145137 A1* | 6/2012 | Shirai | F02B 63/02 123/73 R |
| 2013/0008681 A1* | 1/2013 | Ichihashi | F02B 33/28 123/65 PD |

FOREIGN PATENT DOCUMENTS

| | | | | |
|---|---|---|---|---|
| EP | 2463495 A2 * | 6/2012 | | F02B 25/18 |
| JP | 2000034927 A | 2/2000 | | |
| JP | 2009002311 A | 1/2009 | | |

* cited by examiner

TWO-CYCLE ENGINE

CROSS-REFERENCE TO RELATED APPLICATION

This application claims the benefit of foreign priority to Japanese Patent Application No. JP 2021-124482, filed Jul. 29, 2021, which is incorporated by reference in its entirety.

TECHNICAL FIELD

The present invention relates to a two-cycle engine, i.e., a two-stroke internal combustion engine (hereinafter referred to as a "two-stroke engine"), used on a portable power working machine.

BACKGROUND ART

In a cylinder block of a two-stroke engine used on a portable power working machine such as chainsaws, brush cutters, and blowers, there are provided with an intake passage leading to a crank chamber, an exhaust passage leading to a combustion chamber of an upper portion of the cylinder, and a scavenging passage communicating between the crank chamber and the combustion chamber.

In a two-stroke engine, an air-fuel mixture gas (hereinafter referred to as a "mixture gas") flows into the crank chamber through the intake passage. Then, the mixture gas flows into the combustion chamber through the scavenging passage, and the mixture gas is combusted in the combustion chamber, and by an expansion power of the mixture gas when combusted in the combustion chamber, a piston is reciprocated in the cylinder (for example, see JP 2009-002311 A).

In the above-described two-stroke engine, when the piston descends after the combustion of the mixture gas, an exhaust port of the exhaust passage opens up to the upper portion of the cylinder, and the post-combustion gas in the combustion chamber is exhausted to the exhaust passage (exhaust process).

When the piston descends further, a scavenging port of the scavenging passage is opened to the upper portion of the cylinder, and the mixture gas in the crank chamber flows into the combustion chamber through the scavenging passage (scavenging process).

In the scavenging process of the two-stroke engine, because both the exhaust port and the scavenging port are opened to the cylinder, unburned mixture gas flowed into the combustion chamber from the scavenging port is also exhausted to the exhaust port together with the post-combustion gas in the combustion chamber. When the amount of unburned gas contained in the exhaust gas increases, the amount of hydrocarbon (HC) contained in the exhaust gas increases.

The present invention has been developed to solve the above-described problem, and an object of the invention is to provide a two-stroke engine that enables the unburned gas contained in the exhaust gas to be reduced, and the scavenging efficiency and the combustion efficiency to be improved.

SUMMARY

In order to attain the above-described object, the present invention provides a two-stroke engine comprising: a cylinder block formed with a cylinder and a crank chamber; and a piston slidably mounted in the cylinder. The cylinder block includes: an exhaust passage leading to a combustion chamber in the cylinder through an exhaust port opened to an inner circumferential surface of the cylinder; a scavenging port opened to the inner circumferential surface of the cylinder; a communication passage extending from the scavenging port in a radial direction of the cylinder; and a scavenging passage extending in an axial direction of the cylinder, communicating with the crank chamber, and having an opening portion formed in a bottom surface of the communication passage. A ceiling surface of the communication passage is inclined toward a cylinder head with increasing distance from a scavenging passage side thereof toward the scavenging port. Further, a bottom surface of the communication passage is inclined toward the crank chamber with increasing distance from a scavenging passage side thereof toward the scavenging port.

According to the two-stroke engine, the communication passage between the scavenging passage and the scavenging port is expanded in the axial direction of the cylinder with increasing distance from a scavenging passage side thereof toward the scavenging port. With this configuration, the mixture gas compressed in the scavenging passage is expanded to a large extent in the communication passage and jetted from the scavenging port into the combustion chamber, so that the mixture gas can be dispersed widely in the combustion chamber. This can improve the scavenging efficiency and the combustion efficiency. Further, since a scavenging flow (mixture gas) is expanded in the communication passage, atomization of the mixture gas can be promoted and the mixture gas can be guided into the combustion chamber while spreading in the axial direction of the cylinder. Because the scavenging flow (mixture gas) flows equally in the combustion chamber, the entire range of the cylinder can be sufficiently replaced with newly supplied mixture gas. Accordingly, the two-stroke engine according to the present invention can improve power output and response, while significantly reducing the amount of hydrocarbon (HC) contained in the exhaust gas.

DETAILED DESCRIPTION

An embodiment of the present invention will be described in detail below with reference to the drawings as appropriate.

Figure 1:
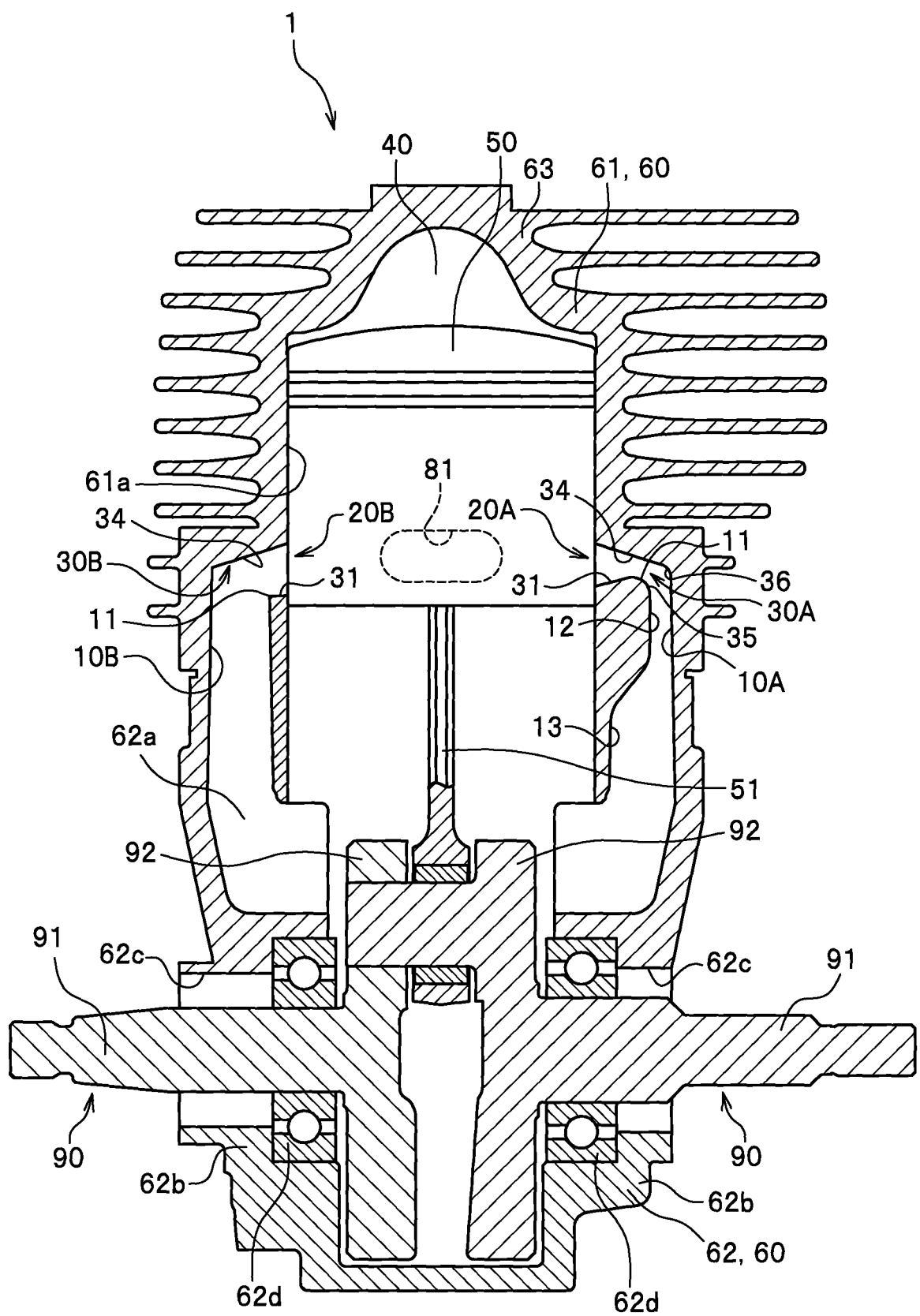
FIG. 1 is a cross-sectional view of an engine according to one embodiment of the present invention, illustrating an intake and compression process viewed from an intake passage.

As seen in FIG. 1, an engine 1 according to this embodiment is a two-stroke engine used for portable power working machines such as chainsaws, brush cutters, and blowers.

The configurations of various engine mechanisms in the engine 1 according to this embodiment are the same as those of known two-stroke engines, and thus the detailed descriptions for other than specific configurations constituting the present invention are omitted.

Figure 2:
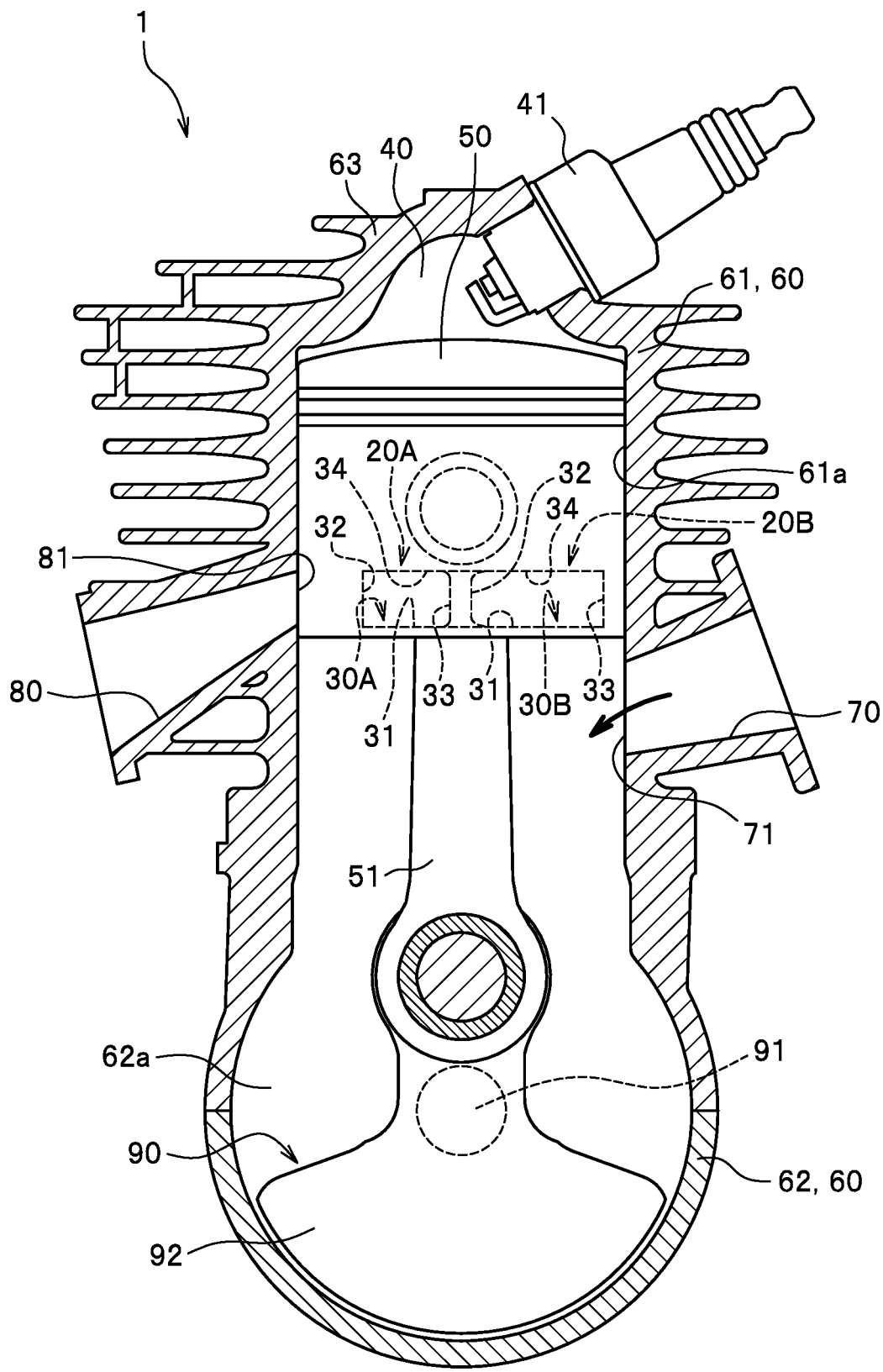
FIG. 2 is a cross-sectional side view illustrating the intake and compression process of the engine according to this embodiment.

As seen in FIG. 2, the engine 1 includes a cylinder block 60 formed with a cylinder 61a and a crank chamber 62a, a piston 50 slidably mounted in the cylinder 61a, and a crank shaft 90 arranged in the crank chamber 62a.

The engine 1 further includes an intake passage 70 leading to the crank chamber 62a, an exhaust passage 80 leading to a combustion chamber 40, and a first scavenging passage 10A and second scavenging passages 10B (see FIG. 5) that make the crank chamber 62a and the combustion chamber 40 communicate with each other.

In the above-described engine 1, when the piston 50 ascends in the cylinder 61a, inside the crank chamber 62a is negative pressured, and a mixture gas of fuel and air produced in a carburetor (not shown) fills up the crank chamber 62a through the intake passage 70.

When the piston 50 reaches a top dead point, a mixture gas flowed in the cylinder 61a in a scavenging process of a previous combustion cycle is compressed in the combustion chamber 40. When the mixture gas is ignited by an ignition plug 41, the piston 50 is then pushed downwards by an expansion power of the mixture gas.

Figure 3:
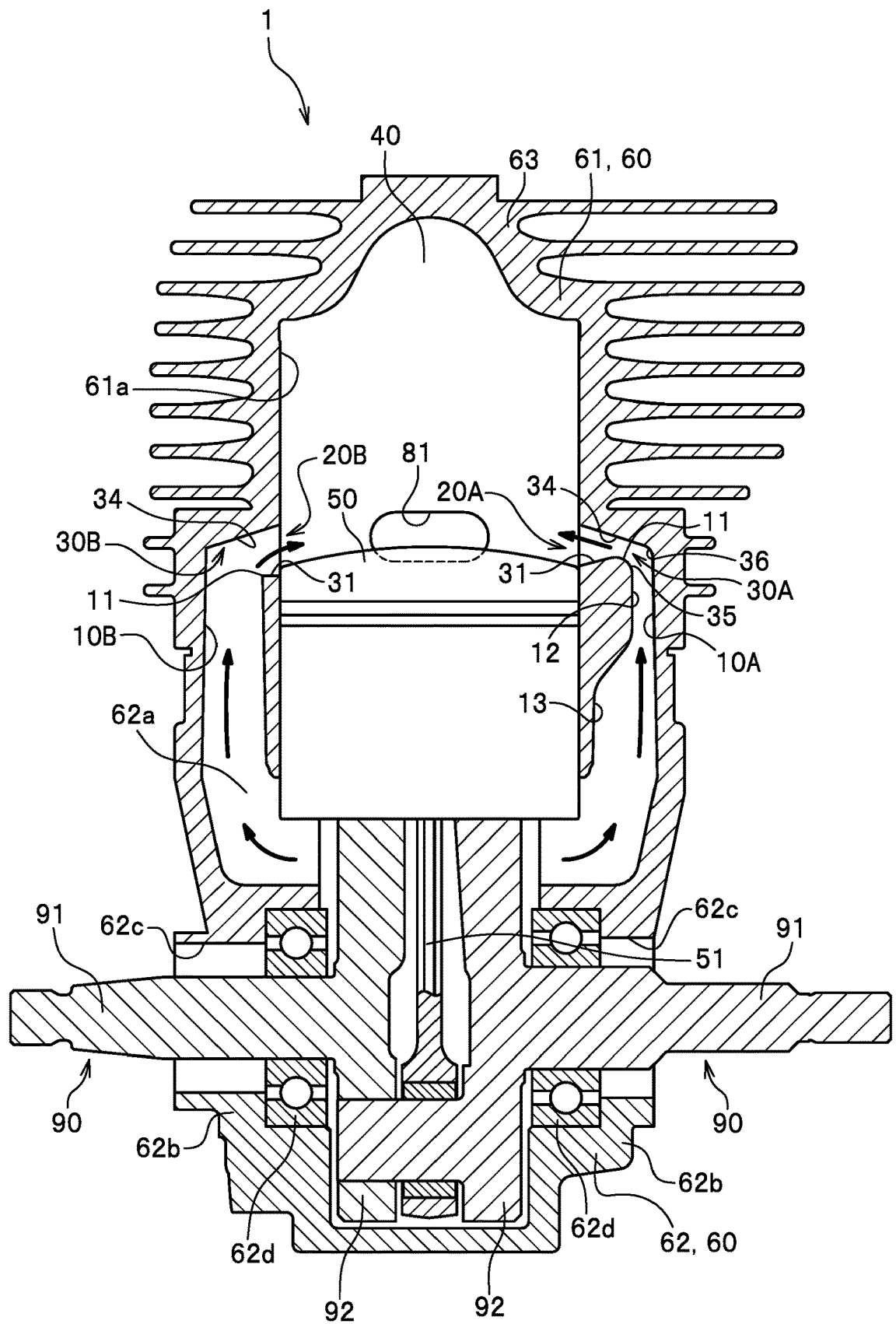
FIG. 3 is a cross-sectional view of the engine according to this embodiment, illustrating a scavenging process viewed from the intake passage.
Figure 4:
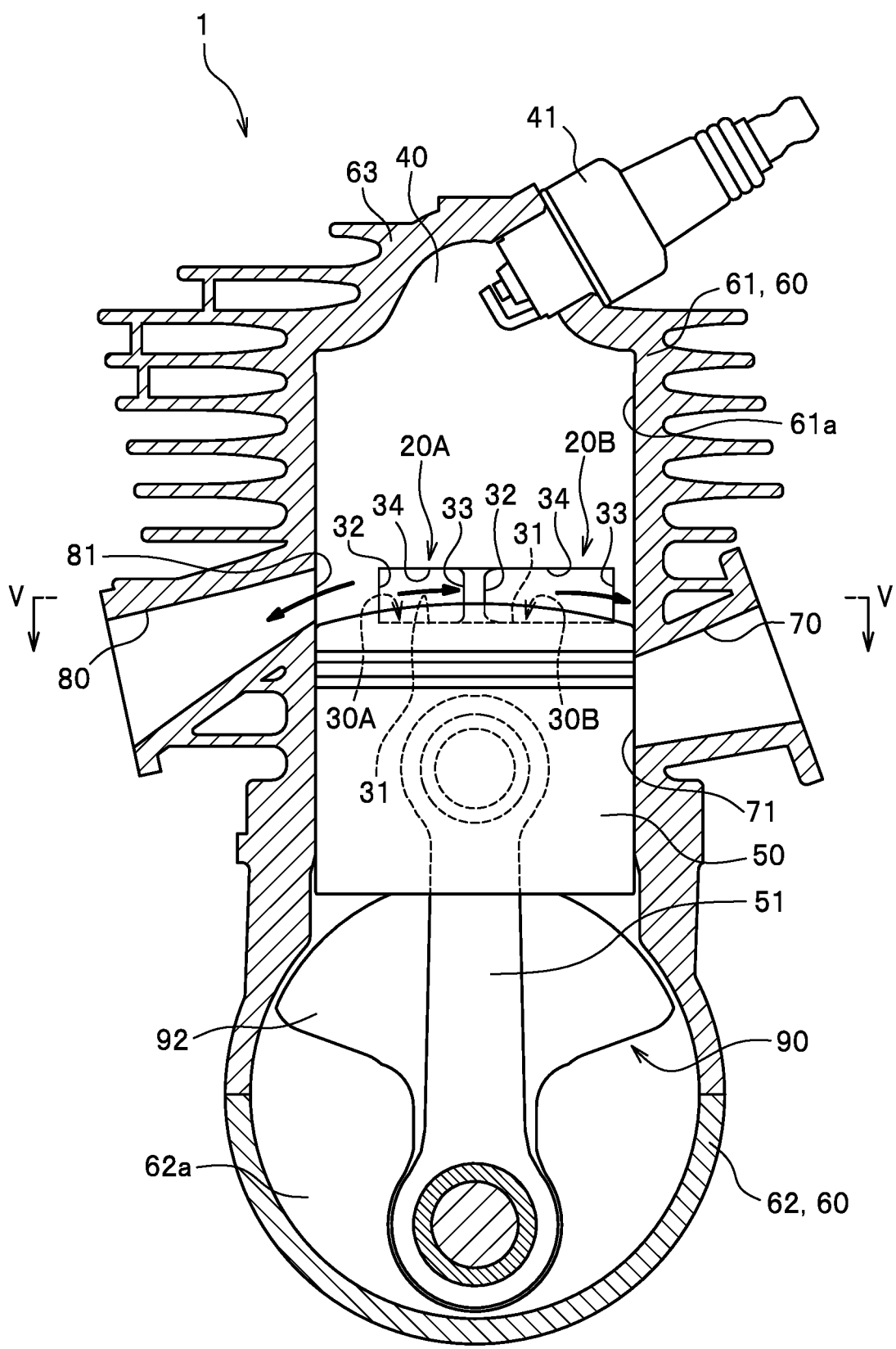
FIG. 4 is a cross-sectional side view of the engine according to this embodiment, illustrating the scavenging process.

When the piston 50 descends, as seen in FIG. 4, the exhaust passage 80 is in communication with the combustion chamber 40, and the post-combustion gas is exhausted to the exhaust passage 80. Further, as seen in FIG. 3, by the descent of the piston 50, the mixture gas filled in the crank chamber 62a is compressed.

Figure 5:
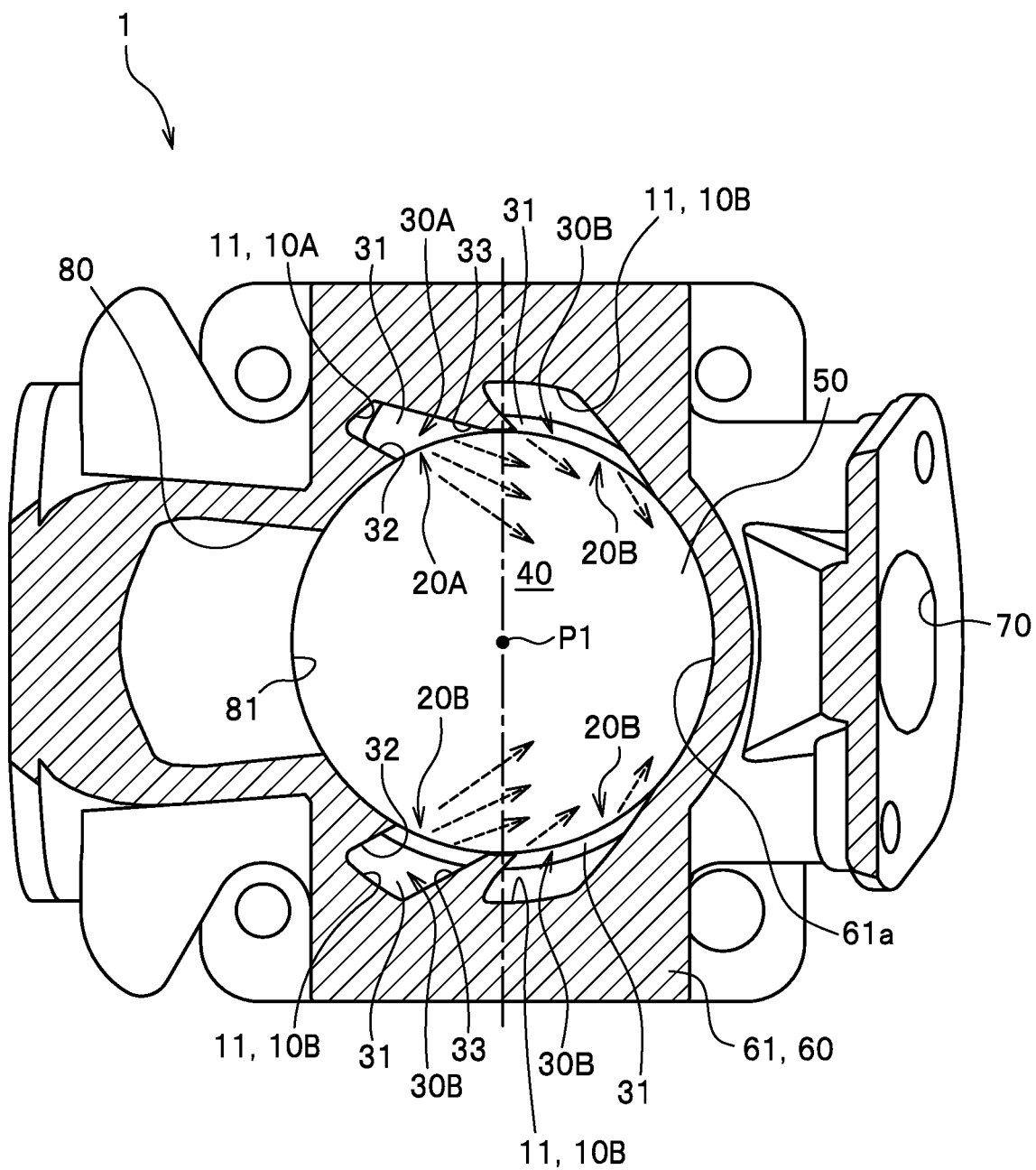
FIG. 5 is a cross-sectional view of the engine according to this embodiment taken on the line V-V of FIG. 4, illustrating the scavenging process.

When the piston 50 reaches a bottom dead point, as seen in FIG. 5, the first scavenging passage 10A and the second scavenging passage 10B are in communication with the combustion chamber 40, and the mixture gas flows into the combustion chamber 40 through the first scavenging passage 10A and the second scavenging passage 10B.

As seen in FIG. 3, the piston 50 reaching the bottom dead point then ascends again by the torque of the crank shaft 90, and thus the intake and compression process is repeated.

As seen in FIG. 1, the cylinder block 60 is divided into a cylinder head 63, an upper block 61 formed with the cylinder 61a and an upper portion of the crank chamber 62a, and a lower case 62 formed with a lower portion of the crank chamber 62a. The upper block 61 and the lower case 62 are assembled one above the other.

Formed on the crank shaft 90 are a crank journal 91 rotatably supported on the lower case 62 and a crank web 92 formed on the crank journal 91.

Bearings 62d are fitted into inner circumferential surfaces of inserting holes 62c formed in sidewall portions 62b of the lower case 62.

The crank journal 91 is inserted into the bearings 62d, and the leading ends of the crank journal protrude outside from the lower case 62.

The crank web 92 is coupled with the piston 50 via a connecting rod 51, and the crank web 92 is configured to rotate around an axis of the crank journal 91 in response to the reciprocation of the piston 50.

As seen in FIG. 2, the intake passage 70 is formed on a side portion (a right side portion in FIG. 2) of the upper block 61, and one end thereof is opened to a lower portion of the cylinder 61a and the other end thereof is connected to a fuel supply passage (not shown).

As seen in FIG. 4, an opening portion 71 of the intake passage 70 that is closer to the cylinder 61a is blocked by a side surface of the piston 50 when the piston 50 is positioned at the bottom dead point, and is opened, as seen in FIG. 2, to the lower portion of the cylinder 61a communicating with the crank chamber 62a when the piston 50 is positioned at the top dead point.

The exhaust passage 80 is formed on a side portion (a left side portion in FIG. 2) of the upper block 61 at a position opposite to the intake passage 70. One end of the exhaust passage 80 is formed with an exhaust port 81 opened to an inner circumferential surface of the cylinder 61a, and the other end thereof is connected to a muffler or silencer (not shown).

As seen in FIG. 4, the exhaust port 81 is in communication with the combustion chamber 40 when the piston 50 is positioned at the bottom dead point, and is blocked, as seen in FIG. 2, by a side surface of the piston 50 when the piston 50 is positioned at the top dead point.

As seen in FIG. 5, the first scavenging passage 10A and the second scavenging passage 10B are formed along an axial direction of the cylinder 61a (see FIG. 1) at positions lateral to the cylinder 61a (upper lateral and lower lateral in FIG. 5) in the upper block 61.

On a side offset from a center position P1 of the cylinder 61a toward the exhaust port 81, the first scavenging passage 10A and the second scavenging passage 10B are formed in a pair across the cylinder 61a at positions upper and lower sides in FIG. 5.

In this embodiment, the first scavenging passage 10A is formed on the upper side in FIG. 5, and the second scavenging passage 10B is formed on the lower side in FIG. 5.

Further, on a side offset from the center position P1 of the cylinder 61a toward the intake passage 70, two second scavenging passages 10B, 10B are formed in a pair across the cylinder 61a at positions upper and lower sides in FIG. 5.

As seen in FIG. 1, the first scavenging passage 10A communicates with the crank chamber 62a at a lower end portion of the first scavenging passage 10A. Formed on an upper end portion of the first scavenging passage 10A is an opening portion 11 that is opened to a bottom surface 31 of a first communication passage 30A to be described later.

It should be noted that in FIGS. 1 and 3, the first scavenging passage 10A, the first communication passage 30A, and the first scavenging port 20A are depicted on the cross section of the center position of the cylinder block 60 for the purpose of easily understanding configurations of the first scavenging passage 10A, the first communication passage 30A, and the first scavenging port 20A.

As seen in FIG. 1, similar to the first scavenging passage 10A, the second scavenging passage 10B communicates with the crank chamber 62a at a lower end portion of the second scavenging passage 10B (see FIG. 1), and an upper end portion of the second scavenging passage 10B has the opening portion 11 formed to be opened to the bottom surface 31 of a second communication passage 30B to be described later.

It should be noted that in FIGS. 1 and 3, the second scavenging passage 10B, the second communication passage 30B, and the second scavenging port 20B are depicted on the cross section of the center position of the cylinder block 60 for the purpose of easily understanding configurations of the second scavenging passage 10B, the second communication passage 30B, and the second scavenging port 20B.

As seen in FIG. 1, the first scavenging passage 10A is formed such that an inner surface thereof located at an outer side in the radial direction of the cylinder 61a is straight along the axial direction of the cylinder 61*a*. Further, the first scavenging passage 10A is formed such that an inner surface located closer to the cylinder 61*a* at a position 12 closer to the first communication passage 30A (the opening portion 11) is arranged more radially outside of the cylinder 61*a* than an inner surface located closer to the cylinder 61*a* at a position 13 closer to the crank chamber 62*a*. In other words, the first scavenging passage 10A is formed such that the inner surface located closer to the cylinder 61*a* at a position 12 closer to the first communication passage 30A has a protrusion formed to protrude farther outward in the radial direction of the cylinder 61*a* than the inner surface located closer to the cylinder 61*a* at a position closer to the crank chamber 62*a*.

This allows the cross-sectional area of the first scavenging passage 10A in the radial direction of the cylinder 61*a* to be formed smaller at a position 12 closer to the first communication passage 30A (the opening portion 11) than at a position 13 closer to the crank chamber 62*a*.

The first scavenging port 20A and the second scavenging port 20B are opening portions each having a rectangular cross-section opened to the inner circumferential surface of the cylinder 61*a* (see FIG. 4).

The first scavenging port 20A and the second scavenging port 20B that are positioned opposite to each other across the cylinder 61*a* are formed at positions on both sides of the exhaust port 81 (upper side and lower side in FIG. 5) on a side offset from the center position P1 of the cylinder 61*a* toward the exhaust port 81.

In this embodiment, the first scavenging port 20A is formed on the upper side in FIG. 5, and the second scavenging port 20B is formed on the lower side in FIG. 5.

Further, two second scavenging ports 20B, 20B that are positioned opposite to each other across the cylinder 61*a* are formed at positions on both sides of the exhaust port 81 on a side offset from the center position P1 of the cylinder 61*a* toward the intake passage 70.

As seen in FIG. 4, the first scavenging port 20A and the second scavenging port 20B are opened to the inner circumferential surface of the cylinder 61*a* at about the same height as that of the exhaust port 81.

Therefore, the first scavenging port 20A and the second scavenging port 20B are opened to the upper portion of the cylinder 61*a* and in communication with the combustion chamber 40 when the piston 50 is positioned at the bottom dead point.

Further, as seen in FIG. 2, the first scavenging port 20A and the second scavenging port 20B are blocked by the side surface of the piston 50 when the piston 50 is positioned at the top dead point.

As seen in FIG. 5, the first communication passage 30A and the second communication passage 30B are passageways formed in a radial direction of the cylinder 61*a*.

On a side offset from the center position P1 of the cylinder 61*a* toward the exhaust port 81, the first communication passage 30A and the second communication passage 30B are symmetrically formed at positions upper and lower sides in FIG. 5 across the cylinder 61*a*. In this embodiment, the first communication passage 30A is formed on the upper side in FIG. 5, and the second communication passage 30B is formed on the lower side in FIG. 5.

Further, on a side offset from the center position P1 of the cylinder 61*a* toward the intake passage 70, two second communication passages 30B, 30B are formed in a pair across the cylinder 61*a* at positions upper and lower sides in FIG. 5.

An opening portion 11 of the first scavenging passage 10A is opened in the bottom surface 31 of the first communication passage 30A. The first communication passage 30A is a passageway communicating between the opening portion 11 and the first scavenging port 20A. A landing portion in the shape of landing is formed between the opening portion 11 and the first scavenging port 20A by the bottom surface 31 of the first communication passage 30A. The landing portion serves as a guiding surface for guiding the mixture gas from below (see FIG. 1).

An opening portion 11 of the second scavenging passage 10B is opened in the bottom surface 31 of the second communication passage 30B. The second communication passage 30B is a passageway communicating between the opening portion 11 and the second scavenging port 20B. A landing portion in the shape of a landing is formed between the opening portion 11 and the second scavenging port 20B by the bottom surface 31 of the second communication passage 30B. The landing portion serves as a guiding surface for guiding the mixture gas from below (see FIG. 1).

The first communication passage 30A and the second communication passage 30B are formed from the opening portions 11 formed in the bottom surfaces 31 toward a far side from the exhaust port (hereinafter referred to as a counter-exhaust port side) that is a side opposite to the exhaust port 81 (i.e., a side closer to the intake passage 70) in the combustion chamber 40 (cylinder 61*a*).

Consequently, the mixture gas flowed into the first communication passage 30A from the opening portion 11 of the first scavenging passage 10A is guided toward the counter-exhaust port side by the first communication passage 30A, and jetted (injected) in the combustion chamber 40 in a direction toward the counter-exhaust port side from the first scavenging port 20A.

Similarly, the mixture gas flowed into the second communication passage 30B from the opening portion 11 of the second scavenging passage 10B is guided toward the counter-exhaust port side by the second communication passage 30B, and jetted (injected) in the combustion chamber 40 in a direction toward the counter-exhaust port side from the second scavenging port 20B.

As seen in FIG. 4, the first communication passage 30A has a rectangular cross-section that is formed with the bottom surface 31, both side surfaces 32, 33, and a ceiling surface 34.

As seen in FIG. 5, among the side surfaces 32, 33 that form the first communication passage 30A, the side surface 33 located at the counter-exhaust port side is inclined from the outside in the radial direction of the cylinder 61*a* toward the first scavenging port 20A in the upper block 61 so as to be away from the other side surface 32 located closer to the exhaust port 81. In other words, the side surface 33 of the first communication passage 30A that is located at the counter-exhaust port side is formed directed toward the far side from the exhaust port (counter-exhaust port side) in the combustion chamber 40 (cylinder 61*a*).

The opening width of the first communication passage 30A in a circumferential direction of the cylinder 61*a* is expanded from the opening portion 11 toward the first scavenging port 20A.

As seen in FIG. 1, the ceiling surface 34 of the first communication passage 30A is inclined toward the cylinder head 63 (upper side in FIG. 1) with increasing distance from the opening portion 11 toward the first scavenging port 20A.

The bottom surface 31 of the first communication passage 30A is inclined toward the crank chamber 62*a* (lower side in FIG. 1) with increasing distance from the opening portion 11 toward the first scavenging port 20A.

As described above, the height of the first communication passage 30A (i.e., width of the first communication passage 30A in the axial direction of the cylinder 61a) is gradually increased toward the first scavenging port 20A from a position outside in the radial direction of the cylinder 61a.

It is preferable that an inclination angle of the bottom surface 31 of the first communication passage 30A toward the crank chamber 62a is set in the range of 70 to 100% of an inclination angle of the ceiling surface 34 of the first communication passage 30A toward the cylinder head 63.

It is preferable that the maximum height (maximum width) of the first scavenging port 20A in the axial direction of the cylinder 61a is equal to or more than twice the minimum height (minimum width) of the first communication passage 30A in the axial direction of the cylinder 61a.

Further, it is preferable that a ratio of the minimum height of the first communication passage 30A in the axial direction of the cylinder 61a to the maximum height of the first scavenging port 20A in the axial direction of the cylinder 61a is set in the range of 1:2 to 1:4.

It is preferable that the opening area of the first scavenging port 20A is equal to or more than four times the minimum cross-sectional area of the first communication passage 30A in the axial direction of the cylinder 61a.

It is preferable that a ratio of the minimum cross-sectional area of the first communication passage 30A in the axial direction of the cylinder 61a to the opening area of the first scavenging port 20A is set in the range of 1:4 to 1:8.

The bottom surface 31 of the first communication passage 30A and an inner wall surface of the first scavenging passage 10A in the radial direction of the cylinder 61a (wall surface of the first scavenging passage 10A at a position closer to the first communication passage) are continuous through an arc-shaped curved surface 35. Further, the ceiling surface 34 of the first communication passage 30A and the inner surface of the first scavenging passage 10A are continuous through an arc-shaped curved surface 36.

The first communication passage 30A according to this embodiment is formed in a divergent form in which the cross-sectional area of the passage gradually expands from the opening portion 11 toward the first scavenging port 20A.

The cross-sectional area of the first communication passage 30A in the axial direction of the cylinder 61a is made larger than the cross-sectional area of the first scavenging passage 10A in the radial direction of the cylinder 61a at a position 12 closer to the first communication passage 30A (opening portion 11).

Similar to the first communication passage 30A, as seen in FIG. 4, the second communication passage 30B has a rectangular cross-section that is formed with the bottom surface 31, both side surfaces 32, 33, and a ceiling surface 34.

As seen in FIG. 5, the side surface 33 of the second communication passage 30B that is located at the counter-exhaust port side is also formed directed toward the far side from the exhaust port (counter-exhaust port side) in the combustion chamber 40.

Further, as seen in FIG. 1, the ceiling surface 34 of the second communication passage 30B is also inclined toward the cylinder head 63 (upper side in FIG. 1) with increasing distance from the opening portion 11 toward the second scavenging port 20B.

The second communication passage 30B is formed such that the cross-sectional area thereof is made larger with increasing distance from the opening portion 11 toward the second scavenging port 20B. The cross-sectional area of the second communication passage 30B in the axial direction of the cylinder 61a is made larger than the cross-sectional area of the second scavenging passage 10B in the radial direction of the cylinder 61a at the opening portion 11.

As seen in FIG. 3, according to the engine 1 of this embodiment, when the piston 50 reaches the bottom dead point, the first scavenging port 20A and the second scavenging port 20B are in communication with the combustion chamber 40.

Accordingly, the mixture gas having been filled in the crank chamber 62a flows into the combustion chamber 40 through the first scavenging passage 10A, the first communication passage 30A, and the first scavenging port 20A.

Further, the mixture gas having been filled in the crank chamber 62a flows into the combustion chamber 40 through the second scavenging passages 10B, the second communication passages 30B, and the second scavenging ports 20B.

According to the engine 1 of this embodiment, the ceiling surface 34 of the first communication passage 30A is inclined toward the cylinder head 63 with increasing distance from the first scavenging passage side thereof to the first scavenging port 20A. Further, the bottom surface 31 of the first communication passage 30A is inclined toward the crank chamber 62a with increasing distance from the first scavenging passage side thereof to the first scavenging port 20A.

With this configuration, the mixture gas compressed in the first scavenging passage 10A is expanded to a large extent in the first communication passage 30A and jetted (injected) from the first scavenging port 20A into the combustion chamber 40. The mixture gas is dispersed in the combustion chamber 40 with respect to the axial direction of the cylinder 61a. As compared with the alternative configuration in which the width of the first communication passage 30A in the axial direction of the cylinder 61a is made constant, atomization of the mixture gas can be promoted upon expansion of the mixture gas and homogeneity of the component of the mixture gas can be improved within the combustion chamber 40. This can stabilize combustion of the mixture gas.

Since the inclination angle of the bottom surface 31 of the first communication passage 30A toward the crank chamber 62a is set in the range of 70 to 100% of the inclination angle of the ceiling surface 34 of the first communication passage 30A toward the cylinder head 63 to slightly extend the first communication passage 30A toward the combustion chamber 40, the mixture gas can efficiently flow into the combustion chamber 40. It is particularly preferable that the inclination angle of the bottom surface 31 of the first communication passage 30A toward the crank chamber 62a is set to be 90% of the inclination angle of the ceiling surface 34 of the first communication passage 30A toward the cylinder head 63.

As seen in FIG. 5, the opening width of the first communication passage 30A in the circumferential direction of the cylinder 61a is gradually expanded toward the first scavenging port 20A from a position closer to the opening portion 11 of the first scavenging passage 10A.

According to the engine 1 of this embodiment, as seen in FIG. 3, the first communication passage 30A is gradually expanded both in the axial direction and the circumferential direction of the cylinder 61a, from a first scavenging passage side toward the first scavenging port 20A. In other words, the first communication passage 30A is formed in a divergent form in which the cross-sectional area of the passage gradually expands from the opening portion 11 toward the first scavenging port 20A.

With this configuration, since the cross-sectional area of the first communication passage 30A expands in the circumferential direction of the cylinder 61a as well as in the axial direction of the cylinder 61a, the mixture gas compressed in the first scavenging passage 10A is expanded to a large extent in the first communication passage 30A and jetted (injected) from the first scavenging port 20A into the combustion chamber 40 so that the mixture gas can be dispersed widely in the combustion chamber 40. This can improve the scavenging efficiency and the combustion efficiency.

As seen in FIG. 1, it is preferable that the maximum height (maximum width) of the first scavenging port 20A in the axial direction of the cylinder 61a is equal to or more than twice the minimum height (minimum width) of the first communication passage 30A in the axial direction of the cylinder 61a.

Further, it is more preferable that the ratio of the minimum height of the first communication passage 30A in the axial direction of the cylinder 61a to the maximum height of the first scavenging port 20A in the axial direction of the cylinder 61a is set in the range of 1:2 to 1:4.

Setting the maximum height of the first scavenging port 20A and the minimum height of the first communication passage 30A in this range makes it possible to efficiently improve the scavenging efficiency and the combustion efficiency.

It is preferable that the opening area of the first scavenging port 20A is equal to or more than four times the minimum cross-sectional area of the first communication passage 30A in the axial direction of the cylinder 61a.

Further, it is preferable that the ratio of the minimum cross-sectional area of the first communication passage 30A in the axial direction of the cylinder 61a to the opening area of the first scavenging port 20A is set in the range of 1:4 to 1:8.

Setting the minimum cross-sectional area of the first communication passage 30A and the opening area of the first scavenging port 20A in this range makes it possible to efficiently improve the scavenging efficiency and the combustion efficiency.

According to the engine 1 of this embodiment, the first scavenging passage 10A is formed such that the inner surface located closer to the cylinder 61a at a position 12 closer to the first communication passage 30A is arranged more radially outside of the cylinder 61a than the inner surface located closer to the cylinder 61a at a position closer to the crank chamber 62a. With this configuration, the bottom surface 31 and the ceiling surface 34 of the first communication passage 30A that serve as guiding surfaces for guiding the mixture gas are set to have sufficient lengths thereof, so that the directivity and the atomization-promoting efficiency of the mixture gas can be enhanced. Further, the cross-sectional area of the first scavenging passage 10A in the radial direction of the cylinder 61a is smaller at a position 12 closer to the first communication passage 30A than at a position 13 closer to the crank chamber 62a.

With this configuration, the mixture gas having flowed from the crank chamber 62a into the first scavenging passage 10A is compressed in the first scavenging passage 10A, and then flows into the cylinder 61a while expanding in the first communication passage 30A. As described above, since the mixture gas is once compressed and then expanded to promote the atomization of the mixture gas and the mixture gas has directivity in the axial direction of the cylinder 61a, it is possible to scavenge the inner side of the cylinder 61a equally. Accordingly, since the mixture gas is introduced equally throughout the entire range of the inner side of the cylinder 61a, the post-combustion gas at the previous combustion cycle is swept out and discharged, and the post-combustion gas is replaced with the mixture gas required for the current combustion cycle without any waste. Therefore, the output and the response of the engine 1 can be significantly improved and the emission of unburned gas can be reduced.

Further, the cross-sectional area of the first scavenging passage 10A in the radial direction of the cylinder 61a at a position 12 closer to the first communication passage 30A is smaller than the cross-sectional area of the first communication passage 30A in the axial direction of the cylinder 61a.

With this configuration, the mixture gas flowed from the first scavenging passage 10A into the first communication passage 30A through the opening portion 11 is once compressed in the first scavenging passage 10A, and then expanded in the first communication passage 30A.

Further, according to the engine 1 of this embodiment, the inner surface of the first scavenging passage 10A and the bottom surface 31 of the first communication passage 30A are continuous through the arc-shaped curved surface 35. Further, the ceiling surface 34 of the first communication passage 30A and the inner surface of the first scavenging passage 10A are continuous through the arc-shaped curved surface 36.

With this configuration, when the mixture gas flows from the first scavenging passage 10A into the first communication passage 30A, the mixture gas can flow smoothly along the curved surfaces 35, 36.

According to the engine 1 of this embodiment, as seen in FIG. 5, the side surfaces 33 of the first communication passage 30A and the second communication passage 30B that are located at the counter-exhaust port side are formed directed toward the counter-exhaust port side in the combustion chamber 40. Further, the cylinder block 60 of the engine 1 according to this embodiment has a plurality of the scavenging ports 20A, 20B, and the first communication passage 30A is formed, among the plurality of the scavenging ports 20A, 20B, from the first scavenging port 20A disposed closer to the exhaust port 81.

With this configuration, since the mixture gases flowed from the first scavenging port 20A and the second scavenging port 20B into the combustion chamber 40 are directed to the counter-exhaust port side, the amount of unburned mixture gas exhausted into the exhaust port 81 can be significantly reduced.

As described above, the engine 1 according to this embodiment can significantly reduce the amount of hydrocarbon (HC) contained in the exhaust gas.

As compared with a conventional engine having no first communication passage 30A, it was shown that the engine 1 according to this embodiment can reduce the amount of hydrocarbon contained in the exhaust gas by about 30%.

Although one preferred embodiment of the present invention has been described in detail, it is understood that the present invention is not limited to the above specific embodiment and various changes and modifications may be made where appropriate without departing from the gist and scope of the present invention.

As seen in FIG. 5, the engine 1 according to this embodiment is configured such that one communication passage among four communication passages is formed in the shape of the first communication passage 30A. However, the number of first communication passages 30A is not limited.

For example, all of the four communication passages may be formed as the first communication passage 30A.

It is preferable that the configuration of the present invention is applied to one scavenging port among adjacent or opposite scavenging ports. With this configuration, since the mixture gases from scavenging ports that are arranged closely to each other flow into the cylinder 61a with different directivities and at different speeds, the directivity of each mixture gas can be maintained while avoiding collision of the mixture gases. This can efficiently improve the scavenging efficiency and the combustion efficiency of the engine 1.

According to the engine 1 of this embodiment, four scavenging ports are formed. However, the number of scavenging ports is not limited. For example, two scavenging ports may be formed one on each side of the exhaust port 81.

The invention claimed is:

1. A two-stroke engine comprising:
a cylinder block formed with a cylinder and a crank chamber; and
a piston slidably mounted in the cylinder,
wherein the cylinder block includes:
an exhaust passage leading to a combustion chamber in the cylinder through an exhaust port opened to an inner circumferential surface of the cylinder;
a scavenging port opened to the inner circumferential surface of the cylinder;
a communication passage extending from the scavenging port in a radial direction of the cylinder; and
a scavenging passage extending in an axial direction of the cylinder, communicating with the crank chamber, and having an opening portion formed in a bottom surface of the communication passage, wherein
a ceiling surface of the communication passage is inclined toward a cylinder head with increasing distance from a scavenging passage side thereof toward the scavenging port, and
a bottom surface of the communication passage is inclined toward the crank chamber with increasing distance from a scavenging passage side thereof toward the scavenging port.

2. The two-stroke engine according to claim 1, wherein a maximum width of the scavenging port in the axial direction of the cylinder is equal to or more than twice a minimum width of the communication passage in the axial direction of the cylinder.

3. The two-stroke engine according to claim 1, wherein a ratio of a minimum width of the communication passage in the axial direction of the cylinder to a maximum width of the scavenging port in the axial direction of the cylinder is set in the range of 1:2 to 1:4.

4. The two-stroke engine according to claim 1, wherein an opening area of the scavenging port is equal to or more than four times a minimum cross-sectional area of the communication passage in the axial direction of the cylinder.

5. The two-stroke engine according to claim 1, wherein a ratio of a minimum cross-sectional area of the communication passage in the axial direction of the cylinder to an opening area of the scavenging port is set in the range of 1:4 to 1:8.

6. The two-stroke engine according to claim 1, wherein an inclination angle of the bottom surface of the communication passage toward the crank chamber is set in the range of 70 to 100% of an inclination angle of the ceiling surface of the communication passage toward the cylinder head.

7. The two-stroke engine according to claim 1, wherein a cross-sectional area of the scavenging passage in the radial direction of the cylinder is smaller at a position closer to the communication passage than at a position closer to the crank chamber, and
the cross-sectional area of the scavenging passage in the radial direction of the cylinder at the position closer to the communication passage is smaller than a cross-sectional area of the communication passage in the axial direction of the cylinder.

8. The two-stroke engine according to claim 7, wherein the scavenging passage is formed such that an inner surface located closer to the cylinder at a position closer to the communication passage is arranged more radially outside of the cylinder than an inner surface located closer to the cylinder at a position closer to the crank chamber.

9. The two-stroke engine according to claim 1, wherein an inner surface of the scavenging passage and the bottom surface of the communication passage are continuous through an arc-shaped curved surface.

10. The two-stroke engine according to claim 1, wherein a side surface located at a counter-exhaust port side that forms the communication passage is formed directed toward the counter-exhaust port side in the combustion chamber.

11. The two-stroke engine according to claim 1, wherein an opening width of the communication passage in a circumferential direction of the cylinder is gradually expanded toward the scavenging port from a position closer to the opening portion of the scavenging passage.

12. The two-stroke engine according to claim 1, wherein the cylinder block has a plurality of the scavenging ports and at least one the communication passage, and
the communication passage is formed, among the plurality of the scavenging ports, from one scavenging port disposed closer to the exhaust port.

* * * * *